US009071917B2

(12) United States Patent
Neumeyer et al.

(10) Patent No.: US 9,071,917 B2
(45) Date of Patent: Jun. 30, 2015

(54) HEARING AID AND HEARING AID DUAL USE DONGLE

(71) Applicant: Audiotoniq, Inc., Austin, TX (US)

(72) Inventors: Frederick Charles Neumeyer, Austin, TX (US); Russell J Apfel, Austin, TX (US); John Michael Page Knox, Austin, TX (US)

(73) Assignee: Audiotoniq, Inc., Austin, TX (US)

( * ) Notice: Subject to any disclaimer, the term of this patent is extended or adjusted under 35 U.S.C. 154(b) by 0 days.

(21) Appl. No.: 13/708,009

(22) Filed: Dec. 7, 2012

(65) Prior Publication Data

US 2014/0003641 A1 Jan. 2, 2014

Related U.S. Application Data

(63) Continuation of application No. PCT/US2011/001077, filed on Jun. 14, 2011, which is a continuation of application No. 13/007,568, filed on Jan. 14, 2011, now Pat. No. 8,761,421.

(60) Provisional application No. 61/416,888, filed on Nov. 24, 2010, provisional application No. 61/388,349, filed on Sep. 30, 2010, provisional application No. 61/362,211, filed on Jul. 7, 2010, provisional application No. 61/354,675, filed on Jun. 14, 2010.

(51) Int. Cl.
*H04R 25/00* (2006.01)

(52) U.S. Cl.
CPC .......... *H04R 25/556* (2013.01); *H04R 2225/31* (2013.01); *H04R 2225/61* (2013.01); *H04R 2420/09* (2013.01)

(58) Field of Classification Search
CPC ........ H04R 25/00; H04R 25/55; H04R 25/60; H04R 25/65; H04R 25/558; H04R 25/602; H04R 2225/31; H04R 2225/33
USPC .................... 381/60, 312, 314–315, 322–324
See application file for complete search history.

(56) References Cited

U.S. PATENT DOCUMENTS

| | | |
|---|---|---|
| 4,845,755 A | 7/1989 | Busch et al. |
| 5,303,306 A | 4/1994 | Brillhart et al. |
| 5,524,150 A | 6/1996 | Sauer |
| 5,608,803 A | 3/1997 | Magotra et al. |
| 5,721,783 A | 2/1998 | Anderson |
| 5,727,070 A | 3/1998 | Coninx |

(Continued)

OTHER PUBLICATIONS

PCT Search Report and Written Opinion, mailed Nov. 22, 2011, for PCT Application No. PCT/US11/01077, filed Jun. 14, 2011, 9 pages.

(Continued)

*Primary Examiner* — Suhan Ni
(74) *Attorney, Agent, or Firm* — Lee & Hayes, PLLC

(57) ABSTRACT

A power dongle for a hearing aid includes conductive wires, each wire having a computing device end and a hearing aid end. A first connector is connected to the computing device end of each of the plurality of conductive wires to releasably couple to an input/output port of the computing device and a second connector is connected to the hearing aid end of each of the plurality of conductive wires to releasably couple to an interface of the hearing aid, the second connector configured to deliver at least one of a first power supply and an audio signal from the computing device to the interface of the hearing aid.

13 Claims, 8 Drawing Sheets

(56) References Cited

U.S. PATENT DOCUMENTS

| | | | |
|---|---|---|---|
| 6,078,675 | A | 6/2000 | Bowen-Nielsen et al. |
| 6,532,294 | B1 | 3/2003 | Rudell |
| 6,920,229 | B2 | 7/2005 | Boesen |
| 7,010,133 | B2 | 3/2006 | Chalupper et al. |
| 7,167,571 | B2 | 1/2007 | Bantz et al. |
| 7,324,650 | B2 | 1/2008 | Fischer et al. |
| 7,451,256 | B2 | 11/2008 | Hagen et al. |
| 7,499,686 | B2 | 3/2009 | Sinclair et al. |
| 7,529,545 | B2 | 5/2009 | Rader et al. |
| 7,561,708 | B2 | 7/2009 | Rohrlein |
| 7,715,576 | B2 | 5/2010 | Ribic |
| 7,778,432 | B2 | 8/2010 | Larsen |
| 7,787,647 | B2 | 8/2010 | Hagen et al. |
| 7,826,631 | B2 | 11/2010 | Fischer et al. |
| 7,853,028 | B2 | 12/2010 | Fischer |
| 8,265,315 | B2 * | 9/2012 | Sorensen et al. ............. 381/323 |
| 2005/0281424 | A1 | 12/2005 | Rass |
| 2006/0198530 | A1 | 9/2006 | Fischer et al. |
| 2008/0240477 | A1 | 10/2008 | Howard et al. |
| 2009/0074216 | A1 | 3/2009 | Bradford et al. |
| 2009/0262964 | A1 * | 10/2009 | Havenith et al. ............. 381/314 |
| 2010/0054511 | A1 | 3/2010 | Wu et al. |
| 2010/0202637 | A1 | 8/2010 | Cornelisse et al. |
| 2011/0176697 | A1 | 7/2011 | Apfel et al. |
| 2011/0200215 | A1 | 8/2011 | Apfel et al. |

OTHER PUBLICATIONS

Final Office Action for U.S. Appl. No. 13/007,568, mailed on May 30, 2013, Russell J. Apfel, "Portable Electronic Device and Computer-Readable Medium for Remote Hearing Aid Profile Storage", 18 pages.

Resound Alera: End User Brochure, instructional brochure, 2010, M101100-GB-10.02 Rev.A, GN ReSound Group, USA 7 pages.

Non-Final Office Action for U.S. Appl. No. 13/007,568, mailed on Dec. 12, 2012, Russell J. Apfel, "Portable Electronic Device and Computer-Readable Medium for Remote Hearing Aid Profile Storage," 18 pages.

PCT Written Opinion for PCT application No. PCT/US11/01077, Dec. 27, 2012, 9 pages.

* cited by examiner

HEARING AID AND HEARING AID DUAL USE DONGLE

CROSS-REFERENCE TO RELATED APPLICATION(S)

This application is a non-provisional of and claims priority to International Application No. PCT/US2011/001077 filed on Jun. 14, 2011 and entitled "HEARING AID SYSTEM," which has an earliest priority date of Jun. 14, 2010 and is incorporated herein by reference in its entirety.

FIELD

This disclosure relates generally to an auxiliary power source for a hearing aid, and more particularly, to a power dongle configured to releasably couple to a hearing aid.

BACKGROUND

One of the leading challenges facing designers of hearing aids involves achieving acceptable battery life without impacting the weight, size, and form factor of the hearing aid. Rechargeable batteries with acceptable size and weight for use in a hearing aid can supply adequate power for approximately one day, thus requiring daily recharge. However, daily recharging is not always available, such as when the user is on a camping trip or vacationing. Thus, there is often a tradeoff between a large heavy rechargeable battery or a smaller lighter non-rechargeable battery that has to be replaced frequently.

Most hearing aids today, use inexpensive disposable batteries, such as the common zinc-air batteries. These batteries have a smaller weight and form factor than rechargeable batteries with acceptable battery life, allowing the hearing aid size and weight to be reduced and increasing desirability for potential customers. However, disposable non-rechargeable batteries require regular replacement, increasing the operating cost of the hearing aid in terms of the cost of replacement batteries, which can be significant over the useful life of the hearing aid. Further, such disposable batteries contribute to landfills and may include corrosive and poisonous chemicals that can leak into the environment.

BRIEF DESCRIPTION OF THE DRAWINGS

In the following description, the use of the same reference numerals in different drawings indicates similar or identical items.

DETAILED DESCRIPTION

A dongle may be coupled to a hearing aid to supply auxiliary power to the hearing aid circuitry, to recharge the hearing aid battery, or both, extending the operational time of the hearing aid before the batteries need to be replaced or recharged. Additionally, the dongle may be further coupled to a media source and provide an audio signal from a media source to the hearing aid in addition to providing power. In some instances, the dongle may be worn, allowing the user to extend the usable battery life of the hearing aid by supplementing the hearing aid's internal power supply.

Figure 1:
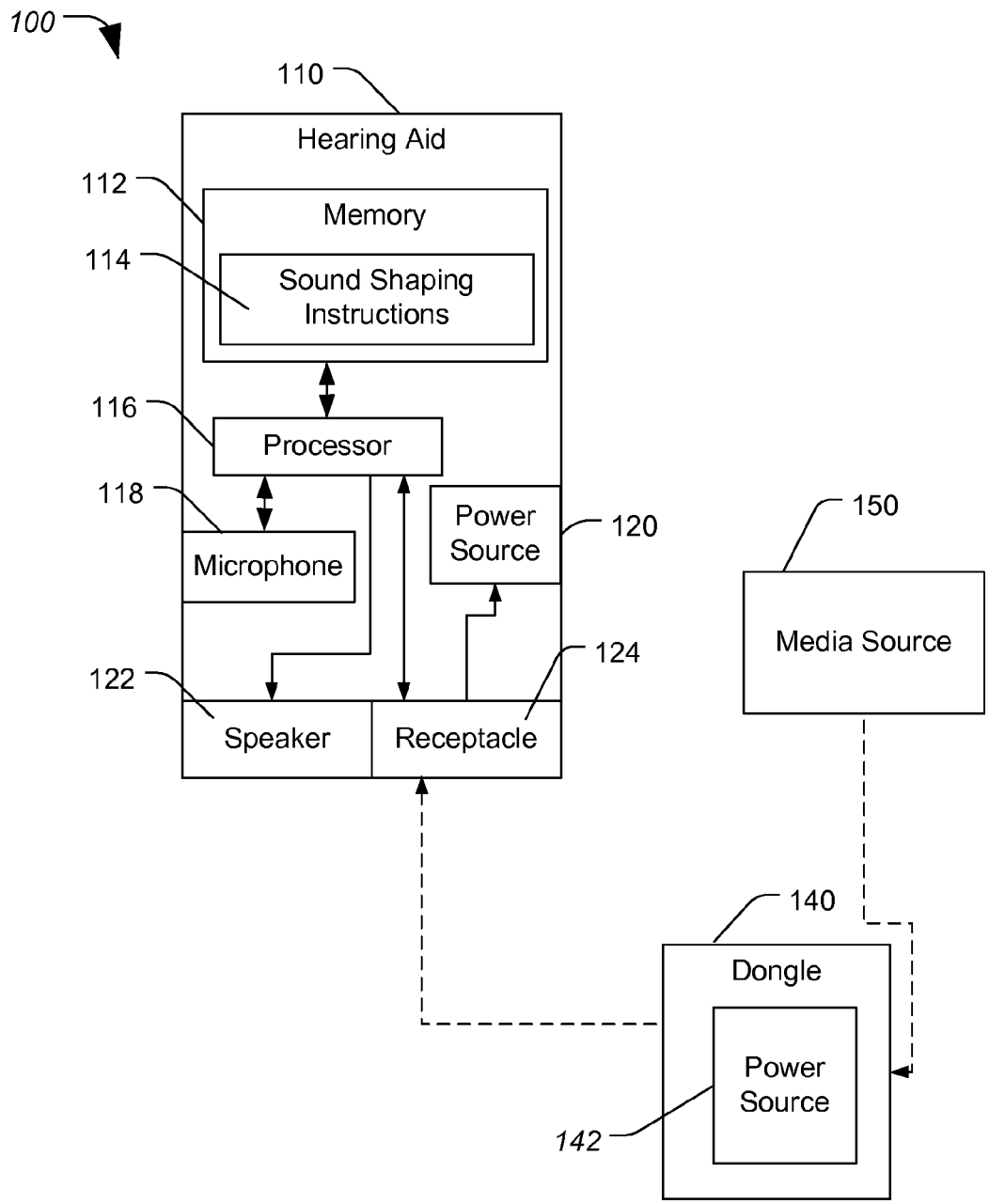
FIG. 1 is a block diagram view of an embodiment of a system including a hearing aid, a dongle, and a media source

FIG. 1 is a block diagram view of an embodiment of a system 100 including a hearing aid 110, a dongle 140, and a media source 150. Media source 150 may be a phone (such as a mobile phone or smart phone), portable music player (such as an MP3, iPod®, or cassette player), computer, stereo or other media-playing device configured to reproduce media content in an audible form.

Dongle 140 is configured to releasably couple to a media source 150 and hearing aid 110 for providing an audio signal and/or a power signal from media source 150 to hearing aid 110. Dongle 140 optionally includes a power source 142 which is configured to provide a second power signal to hearing aid 110 to either provide an auxiliary power source and/or a recharge function, regardless of whether or not dongle 140 is coupled to media source 150.

Hearing aid 110 has a receptacle 124 sized to receive (to electrically couple to) dongle 140. Receptacle 110 is coupled to a power source 120 and a processor 116. Hearing aid 110 further includes microphone 118 connected to processor 116, and includes a speaker 122 coupled to processor 116 and configured to communicate audio data to an ear piece, which may be positioned within the ear canal of a user. Hearing aid 110 also includes a memory 112 which stores sound shaping instructions 114. Memory 112 is coupled to and accessible by processor 116, such that processor 116 is able to execute and shape audio signals according to the sound shaping instructions 114 stored in memory 112. In an alternative embodiment, speaker 122 may be replaced with a driver circuit that is connected by a wire to a speaker within an ear bud (not shown) that is positioned within the ear canal of the user.

In one example when dongle 140 uncoupled from hearing aid 110, microphone 116 converts sounds into a first audio signal and provides the first audio signal to processor 116, which processes the first audio signal according to sound shaping instructions 114 to generate a modulated audio signal configured to compensate for the user's hearing loss. The modified output signal is provided to speaker 122, which reproduces the modulated output signal as an sound. Power source 120 provides power to the circuitry of hearing aid 110, while it modulates audio signals for the user.

In a second example when dongle 140 is coupled to hearing aid 110, hearing aid 110 receives a power signal and/or a second audio signal from dongle 140 at receptacle 124. The power signal may include power from power source 142 and/or media source 150. The second audio signal is the audio signal produced by media source 150.

Processor 116 receives the first audio signal from microphone 116 and the second audio signal from media source 150. Processor 116 combines and shapes both signals according to sound shaping instructions 114 to generate the modulated audio signal. Processor 116 may combine the first and second audio signals into a combined audio signal then shape the combined signal to produce the modulate audio signal or shape each of the first and second audio signals independently to produce a first modulated audio signal and a second modulated audio signal then combine the first and second modulated audio signals into the modulated audio signal. In one example, processor 116 may completely block out the first audio signal while processor 116 receives the second audio signal, such that the modulated audio signal only includes sounds represented in the second audio signal (such as when the user is listening to music).

Hearing aid 110 also receives a power source 120 from dongle 140. When hearing aid 110 receives a power source from dongle 140, power source 120 may be disconnected from the rest of the circuitry of hearing aid 110 to conserve battery life, while hearing aid 110 receives power from dongle 140. In an alternative embodiment, power source 120 may remain connected to the circuitry, and the power signal provides a power assist to power source 120, reducing the power demands on power source 120 and extending the life of power source 120. In another alternative embodiment, the power signal may provide power to recharge power source 120 in lieu of or in addition to providing power directly to the circuitry, thereby recharging and prolonging the life of the power source 120.

While FIG. 1 depicts a system over providing the large picture of the components of system 100 including three devices: hearing aid 110, media source 150, and dongle 140, FIGS. 2-5 depict several possible embodiments of dongle 140.

Figure 2:
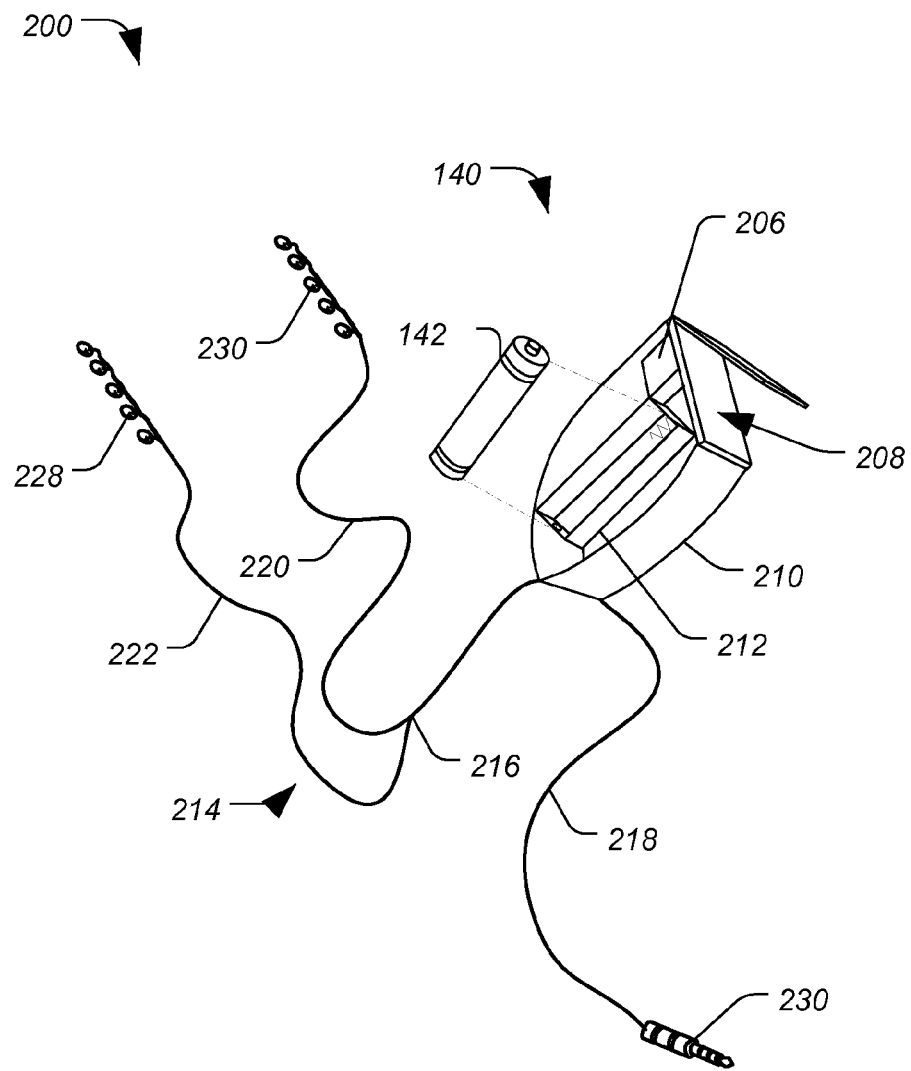
FIG. 2 is a perspective view of an embodiment of the dongle of FIG. 1.

FIG. 2 is a perspective view of an embodiment 200 of dongle 140 of FIG. 1. Dongle 140 which includes power source 142 (shown here as a AAA battery) and a casing 210 that defines a cavity sized to contain a battery receptacle 212 for securing power source 142. In this embodiment, casing 210 is depicted in an exploded view, with power source 142 removed from battery receptacle 212 to demonstrate that power source 142 may be replaceable and that casing 210 may contain an opening for allowing the user to access and replace power source 142. Dongle 140 may also include a removable cover (not shown) to secure power source 142 within battery receptacle 212. In an alternative embodiment, casing 210 may be sealed, and power source 120 may be rechargeable. Additionally, while only one battery is shown, it is possible to include multiple batteries in parallel or series to provide recharge and/or operating power to hearing aid 110.

Power source 142 is optionally coupled to a power regulator 206, which can be configured to regulate the voltage and/or current provided by power source 142 to provide a regulated power supply that can be used within the hearing aid. In some cases, when the power supplied by power source 142 matches that used within hearing aid 110, power regulator 206 may be omitted, switched off, or bypassed.

Dongle 140 may also include a securing mechanism, generally indicated at 208, connected to the outside of casing 210 for securing dongle 140 to a user's clothing. Securing mechanism 208 may be, for example, a clip, clasp, hook, or other known securing device. In the illustrated example, the securing mechanism 208 is a clip configurable to clip onto an object (such as a piece of clothing). For example, securing mechanism 208 allows the user to attach dongle 140 to an article of clothing transferring the weight of dongle 140 from the user to the user's clothing, increasing the comfort, security, and adaptability of using dongle 140.

Power regulator 206 and power source 142 are coupled to a cable, generally indicated by 214, which is designed to releasable couple to receptacle 124 of hearing aid 110 to establish an electrical contact between the devices, for example, to provide the power signal to hearing aid 110. Cable 214 divides into two branches 220 and 222 at branch point 216 for delivering the power signal and/or the second audio signal to two hearing aids. The two branches 220 and 222 include connection interfaces 228 and 230 at the ends opposing the branch point 216. Connection interfaces 228 and 230 are designed to releasably couple to receptacles (such as receptacle 124 of FIG. 1) on a right and a left hearing aid (each represented by hearing aid 110) to provide a power signal and/or an audio signal to both the right and left hearing aids. Cable 214 and branches 220 and 222 allow the user to locate dongle 140 away from the hearing aids and to supply the power signal and audio signal to both a right and left hearing aid at the same time.

Dongle 140 also includes a second cable 218 connected to power regulator 206 and/or cable 214 at one end and a media connector 230 at the other. Media connector 230 is shown as a tip ring sleeve (TRS) connector; however, many other types of connectors are possible including a universal serial bus (USB) connector, modified TRS connector, mini USB connector, or other known media connectors at least capable of providing an audio signal. Media connector 230 is configured to releasably couple to a media source (such as media source 150 of FIG. 1) to receive a power signal and/or an audio signal from media source 150. Cable 218 is configured to provide the power signal to power regulator 206, which regulates the voltage and/or current provided by media source 150 to provide a regulated power supply that may be used to recharge power source 120 or provided directly to hearing aid 110 as the power signal.

In one embodiment, a user couples dongle 140 to at least one hearing aid via connection interfaces 228 and/or 230, which are configured to fit receptacles (such as receptacle 124) on the hearing aids. Connection interfaces 228 and 230 may snap, lock, magnetically mate, hook or otherwise physically, releasably connect to the receptacles. In one example, connection interfaces 228 and 230 may be a mini plug and/or may use a spring locking mechanism to couple to the receptacle. In a second example, connection interfaces 228 and 230 may include a magnetic element that magnetically couples to an element associated with the receptacle of the hearing aid, securing the connection interfaces 228 and 230 to the receptacles using magnetic forces. Once a connection is made, power source 142 provides a power signal to the hearing aids through connection interfaces 228 and 230. Power regulator 206 may receive the power signal from power source 124 and regulate the power signal to produce a regulated power signal suitable for the hearing aids to perform battery management operations (such as normal operation, recharge, etc.).

In another embodiment, a user couples dongle 140 to one or more hearing aids via connection interfaces 228 and/or 230 and a media source 150 via media connector 230. An audio signal is provided to the hearing aids from media source 150 via dongle 140 such that the hearing aids may modulate the audio signal and reproduce the audio signal as a modulated output signal for the hearing aid user. A power signal may also be provided to the hearing aids from dongle 140 such that the hearing aids may perform battery management operations. The power signal may include a power supply from media source 150 and/or a power supply from power source 142. For example, dongle 140 may disconnect power source 142 from cable 214 when receiving a power signal from media source 150 preserving the stored charge of power source 142 until media source 150 is disconnected. In another example, dongle 140 may supplement the power signal form media source 150 with a power supply from power source 142 to increase the power signal provided to the hearing aids. Thus dongle 140 is able to be used to recharge and/or power the hearing aids while the user is listing to an audio signal from a media device, such as when the user is listening music.

In yet another embodiment, a user couples dongle 140 to one or more hearing aids via connection interfaces 228 and/or 230 and a media source via media connector 230. Once a connection is made, an audio signal is provided to the hearing aids from media source 150 via dongle 140 such that the hearing aids may modulate the audio signal and reproduce the audio signal as a modulated output signal for the hearing aid user. Power source 142 also provides a power signal to the hearing aids through connection interfaces 228 and 230, such that the hearing aids are able to perform battery management operations in response to receiving the power signal. Dongle 140 also receives a second power signal from media source 150, which dongle 140 uses to recharge power source 142. In this manner, power source 142 is losing charge as it provides power to the hearing aids and power source 142 gaining charge as it receives power from media source 150.

In an example, the power signal received from dongle 140 may be used in the hearing aid to provide battery management operations such as a recharge to an internal power source of the hearing aid (such as power source 120), providing power to the circuitry within the hearing aid to perform normal hearing aid operations, or both. In a particular example, the hearing aid may include a switch or controllable element accessible via a control device, such as a cell phone or portable computer, to allow the user to select an operating mode (such as recharge).

In the illustrated embodiment, cable 214 is shown with two branches 220 and 222. In an alternative embodiment cable 214 may contain one branch 220 for providing a power signal and/or an audio signal to a single hearing aid 110. For example, in about a third of the cases a user has hearing loss in a single ear and would, thus, have one hearing aid 110. In this situation it is desirable for dongle 140 to include cable with a single branch 220 and connector 228.

Additionally, power source 142 is shown as a triple-A (or AAA) battery commonly available at most stores. It should be understood that casing 210 may be designed to receive other common battery types and various configurations. For example, the batteries can be stacked "button" or "coin"-type batteries. Alternatively, the batteries could be AA, C, or D. Further, the batteries could be 3V, 4.5V or other voltage levels. Moreover, though cylindrical form-factor batteries are shown, rectangular or other form factors may also be used. By utilizing common types of batteries, dongle 140 allows a user to make use of available power sources for providing auxiliary power to hearing aid 110, increasing the ease of use, as the user is much more likely to have ready access to AAA batteries or other standard battery types than a zinc air battery typically used in non-rechargeable hearing aids. The standard battery allows for a more versatile power dongle system that is much more likely to be effective in providing the user with a backup power supply for their hearing aid.

Figure 3:
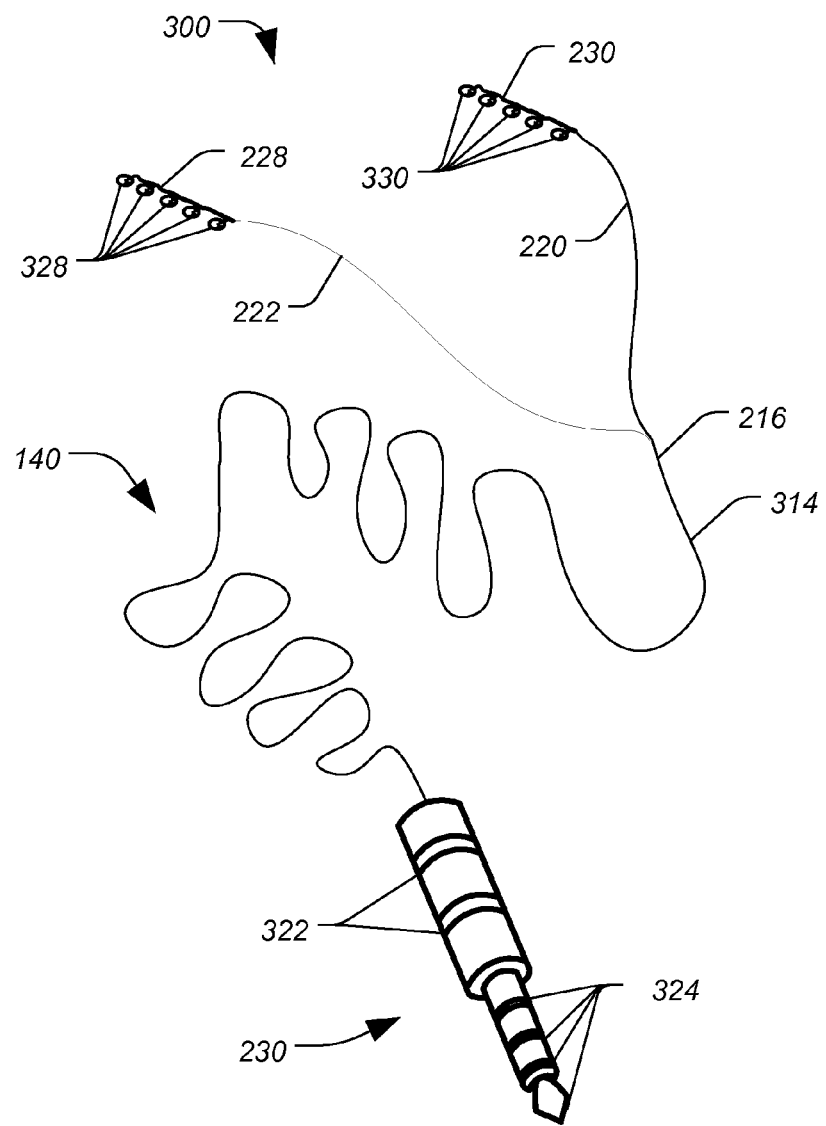
FIG. 3 is a perspective view of a second embodiment of the dongle of FIG. 1.

FIG. 2 provides a one possible embodiment 200 of dongle 140 including a casing 210 including internal power source 142 and coupled to cables 214 and 218. FIG. 3 provides a second possible embodiment of dongle 140 that without a casing or internal power source coupled to the cable.

FIG. 3 is a perspective view of a second embodiment 300 of dongle 140 of FIG. 1. Dongle 140 includes cable 314 (a combination of cable 214 and 218 of FIG. 2) having a first end coupled to media connector 230 and a second end that divides at branch point 216 to form two branches 220 and 222 for delivering a power signal and/or an audio signal to one or more hearing aids. The two branches 220 and 222 include connection interfaces 228 and 230 at the ends opposing branch point 216. Media connector 230 is a modified TRS connector. Media connector 230 includes the typical four contacts 324 for left audio, right audio, microphone, and audio ground two additional contacts 322 for power and power ground. Contacts 322 are on a second level of media connector 230 that is wider than the first level containing contacts 324, such that if media source 150 is not adapted to receive the modified TRS connector only contacts 324 are connected allowing dongle 140 to provide an audio signal from media source 150 to the hearing aids but not a power signal. Connection interfaces 228 and 230 each include five contacts 238 and 330 that correspond to the contacts on media connector 230. Contacts 238 and 330 each include a power, a power ground, a microphone, an audio ground, and either a right and left audio.

In an embodiment, a user couple's dongle 140 to one or more hearing aids via connection interfaces 228 and/or 230 and a media source 150 via media connector 230. Once a connection is made to both the hearing aids and media source 150, an audio signal is provided to the hearing aids from media source 150 via contacts 324 and corresponding contacts 328 and 330 of dongle 140, such that the hearing aids may modulate the audio signal and reproduce the audio signal as a modulated output signal for the hearing aid user. Dongle 140 may also provide a power signal suitable for the hearing aids to perform battery management operations from media source 150 to the hearing aids via contacts 322 and the corresponding contacts 328 and 330.

However, most media devices 150 are not adapted to receive the modified TRS version of media connector 230 and, therefore, for most media devices 150 that dongle 140 couples to using the modified TRS version no power signal is provided. Thus dongle 140 is able to provide an audio signal from media source 150 to the hearing aids but not a power signal (if dongle 140 includes a power source, such as power source 142 of FIGS. 1 and 2, then dongle may provide a power source to the hearing aids even if media source 150 is not adapted to receive the modified TRS). In alternative embodiments of media connector 230, such as a mini USB version, both power and audio signals may be provided.

In the illustrated embodiment of FIG. 3, dongle 140 is depicted as a pass-through connector for both an audio signal and a power signal from media source 150 to the hearing aids. In an alternative embodiment, dongle 140 may also include a power regulator, such as power regulator 206 of FIG. 2, to produce a regulated power signal suitable for the hearing aids to perform battery management operations (such as normal operation, recharge, etc.) from the power signal. Additionally, dongle 140 is shown with a modified TRS media connector 230. Other possible connectors capable of providing both an audio signal and a power signal are contemplated, such as a USB connector or mini USB connector, among other known connectors.

FIGS. 2 and 3 depict two possible embodiments 200 and 300 of dongle 140. Both embodiments 200 and 300 depict dongle 140 as one component, however, FIG. 4 depicts another possible embodiment of dongle 140, wherein dongle 140 may be separated into two components.

Figure 4:
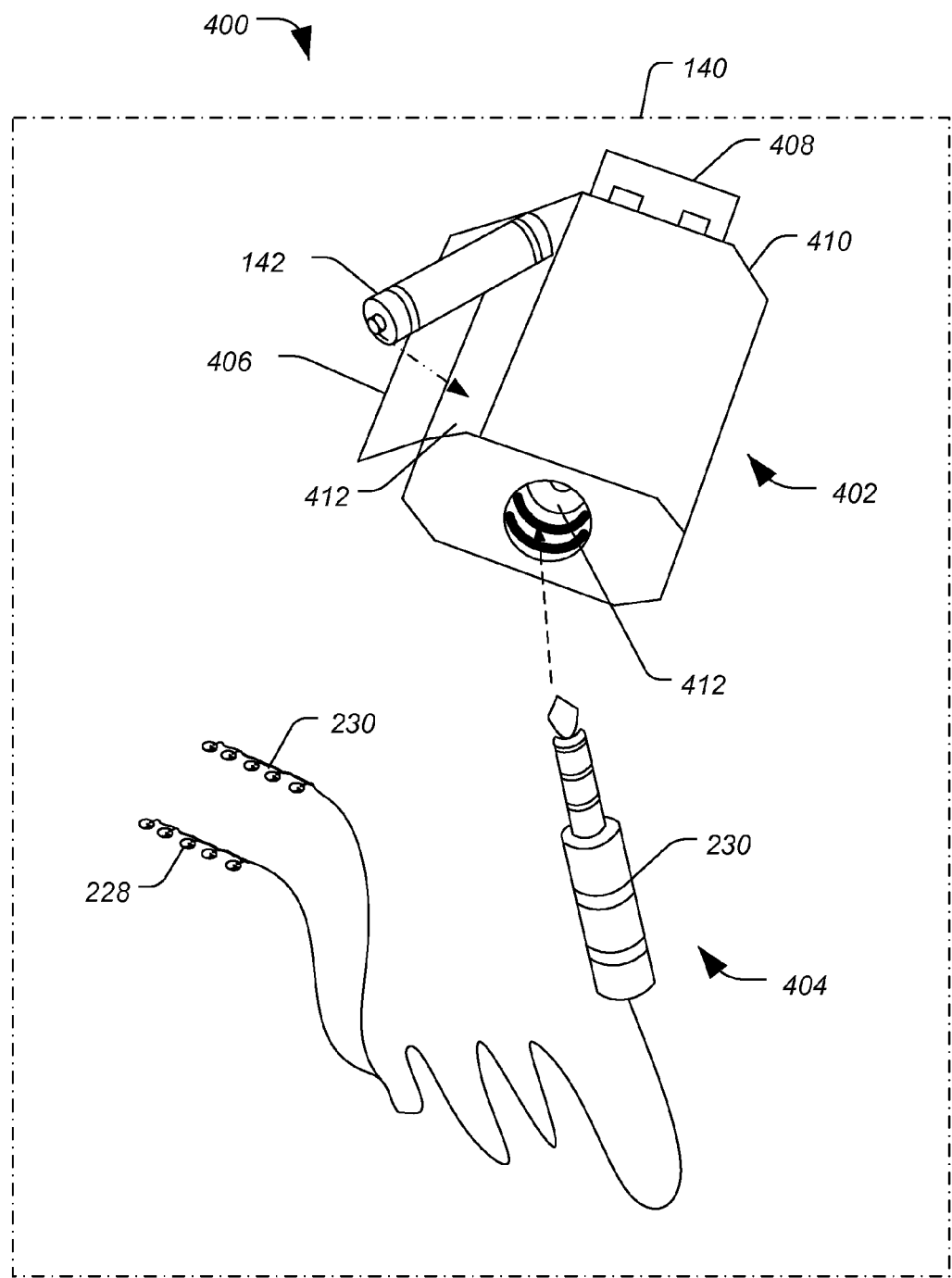
FIG. 4 is a perspective view of a third embodiment of the dongle of FIG. 1.

FIG. 4 is a perspective view of a third embodiment 400 of dongle 140 of FIG. 1. In this embodiment, dongle 140 includes two components, cable component 404 and dongle component 402, which when assembled form dongle 140. Cable component 404 includes media connector 230 (shown as a modified TRS connector) and connection interfaces 228 and 230 for releasably coupling cable component 404 to two hearing aids.

Dongle component 402 includes a casing 410 including a cover 406 that when open defines a cavity sized to contain a battery receptacle 412 for securing power source 142 within dongle component 402. In this embodiment, casing 410 is depicted in an exploded view, with power source 142 removed from battery receptacle 412 to demonstrate that power source 142 may be replaceable and that casing 410. In an alternative embodiment, cover 406 may be sealed, and power source 120 may be rechargeable. Casing 410 also includes two connector components, a USB connector 408 for coupling dongle component 402 to a media source, such as media source 150 of FIG. 1, and a cable connector 412 configured to receive media connector 230 of cable component 404.

In an example, connection interfaces 228 and 230 of cable component 404 are coupled to one or more hearing aids. Media connector 230 is coupled to media source 150 and cable component 404, which operates in a similar manner as to embodiment 300 of dongle 140. Alternatively, media connector 230 may be coupled to cable connector 412 of dongle component 402 to complete the assembly of dongle 140. If dongle component 402 is coupled to cable component 404 and cable component is coupled to one or more hearing aids then dongle 140 may provide a power signal form power source 142 to the one or more hearing aids as described in FIG. 2.

Dongle component 402 may also be coupled to a media source 150 via USB connector 408. When dongle component 402 is coupled to media source 408 and to one or more hearing aids through cable component 404, an audio signal may be provided to the one or more hearing aids from media source 150. Additionally, a power signal including a power supply from media source 150 and/or a power supply from power source 142 may be provided to the hearing aids. In an example, dongle 140 may disconnect power source 142 preserving the stored charge of power source 142 until media source 150 is disconnected. In another example, dongle 140 may supplement the power signal form media source 150 with a power supply from power source 142 to increase the power signal provided to the hearing aids. In yet another example, dongle 140 may provide power signal form power source 142 to the hearing aids, while at the same time recharging power source 142 from the power supplied by media source 150.

Thus an embodiment 400 of dongle 140 is disclosed, including a cable component 404 that may be utilized to provide an audio signal from media source to the one or more hearing aids, a power signal from media source to the one or more hearing aids or both and a dongle component 402 that can be coupled to cable component 404 to provide a power signal from power source 142 to the one or more hearing aids, a power signal from media source 150 to the one or more hearing aids, an audio signal from media source 150 to the one or more hearing aids, or a combination signal including a power signal from either power source 142 or media source 150 and audio signal from media source 150.

Figure 5:
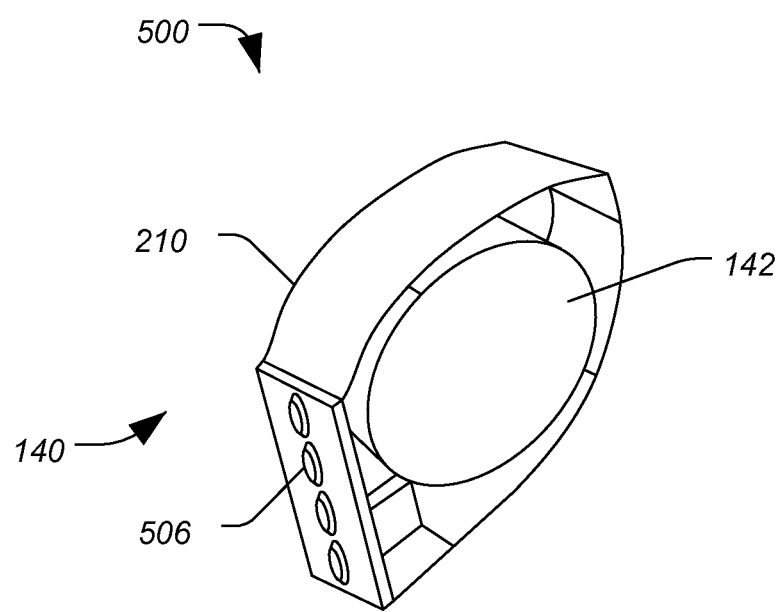
FIG. 5 is a perspective view of a fourth embodiment of the dongle of FIG. 1.

While FIGS. 2-4 show dongle 140 configured to provide a power signal and/or an audio signal to hearing aid 110, FIG. 5 depicts another embodiment of dongle 140 that is configured to provide a power signal to hearing aid 110 without ever having to couple to media source 150.

FIG. 5 is a perspective view of a fourth embodiment of dongle 140, which includes a battery, such as a power source 142. Dongle 140 includes casing 210 that defines a cavity sized to secure a power source 142 for powering a hearing aid, such as hearing aid 110 of FIG. 1 and includes a connection interface 506 integrated into casing 210, which is designed to releasable couple to a receptacle 124 of hearing aid 110 to establish an electrical contact and to provide power to hearing aid 110. Power source 142 may be a rechargeable or a disposable power source.

Connection interface 506 is configured to snap, lock, magnetically mate, hook or otherwise physically, releasably connect to the receptacle 124. In one example, connection interface 506 may be a mini plug and/or may use a spring locking mechanism to couple to the receptacle. In a second example, connection interface 506 may include a magnetic element (not shown) that magnetically couples to an element associated with the receptacle of the hearing aid, securing the connection interface 506 to receptacle 124 using magnetic forces. The element in the hearing aid may be metallic or may be otherwise magnetically attracted to the magnetic element of the connection interface 506.

Thus an embodiment of dongle 140 is disclosed, wherein dongle 140 is configured to attach to hearing aid 110 such that it's weight is fully supported by the magnetic or mechanical connection between connection interface 506 and receptacle 124, securing dongle 140 to hearing aid 110 behind the ear of the user in a hands free, wire free embodiment.

In the illustrated embodiments of FIGS. 2-5, connection interfaces 228, 230, and 506 and receptacle 124 are designed to mechanically and electrically connect such that receptacle 124 receives one of connection interfaces 228, 230, and 506 to form a connection assembly, through which dongle 140 can deliver a power signal and/or an audio signal to hearing aid 110. In one embodiment, connection interfaces 228, 230, and 506 includes a magnet and receptacle 124 includes a corresponding element that is magnetically attracted to the magnet of the connector or a magnet of opposite polarity to the magnet of connection interfaces 228, 230, and 506, which cooperate to secure the connection interfaces 228, 230, and 506 to the receptacle 124 via a magnetic field. In another embodiment, receptacle 124 includes the magnet and connection interfaces 228, 230, and 506 includes a magnet of opposite polarity or a corresponding element that is magnetically attracted to the magnet of the receptacle to secure the connection interfaces 228, 230, and 506 to receptacle 124 via the magnetic field. In another embodiment, a physical latch, snap, or clip (located on either the connection interfaces 228, 230, and 506 or the receptacle 124) may be used to secure the connection interfaces 228, 230, and 506 to receptacle 124.

Figure 6:
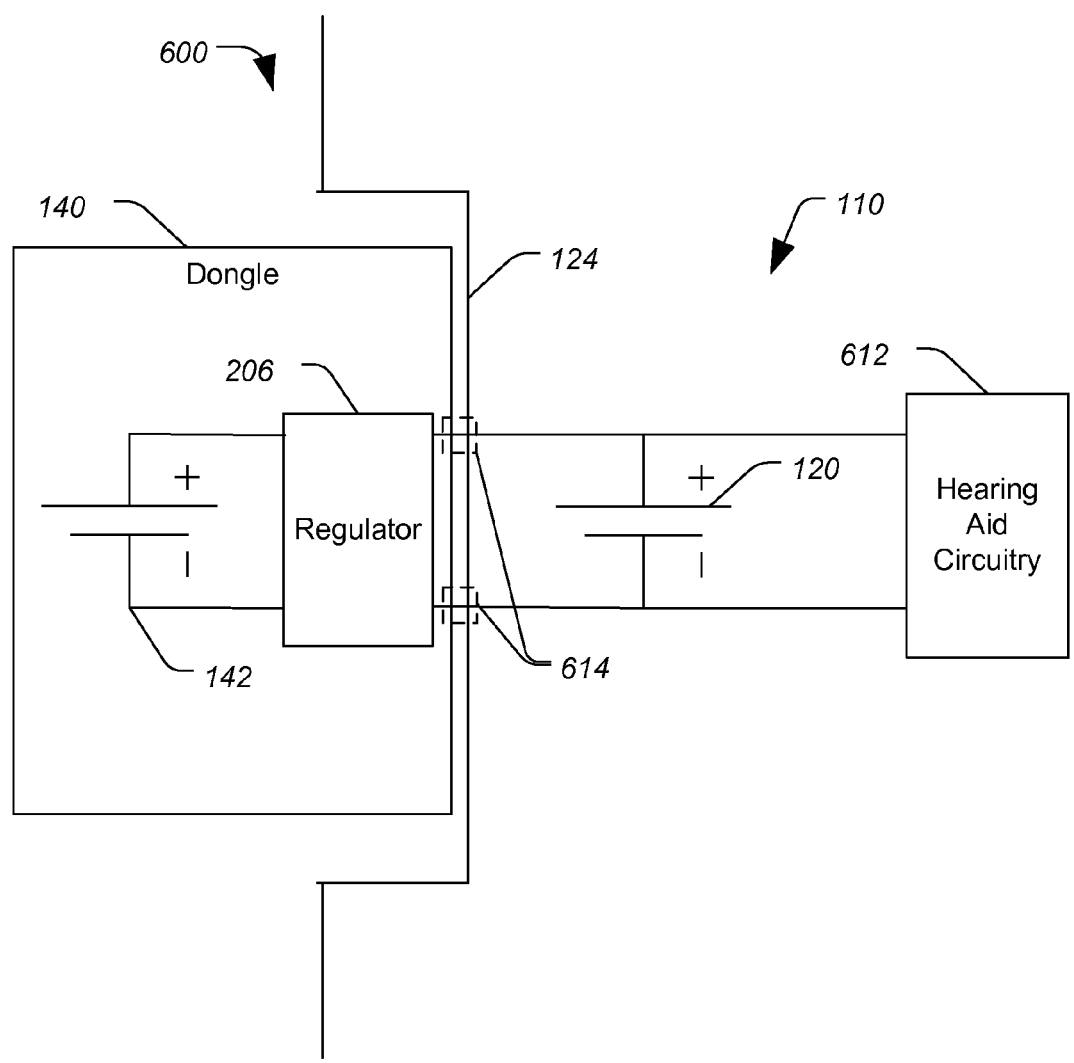
FIG. 6 is a block diagram of a circuit including of the dongle of FIGS. 2-5 connected to the hearing aid for recharging the power source.
Figure 7:
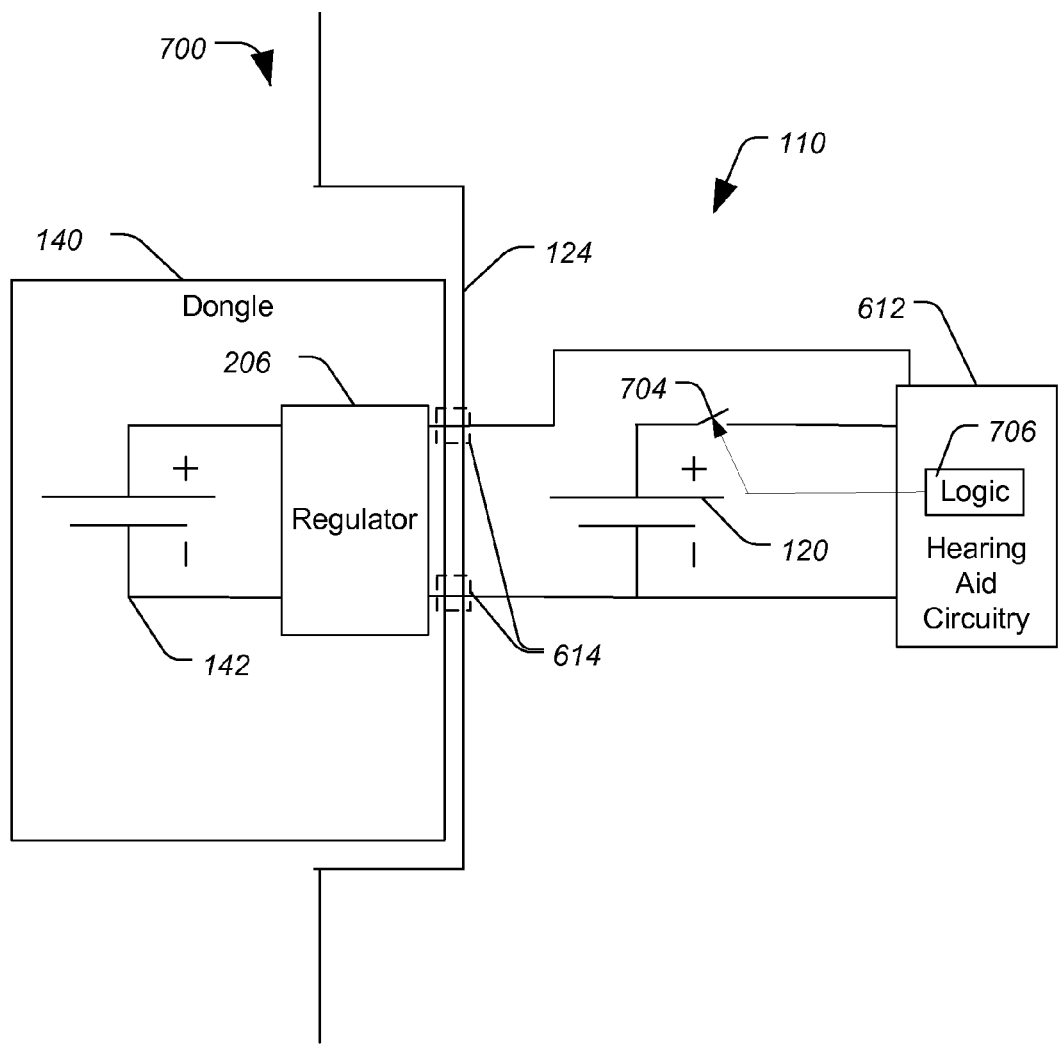
FIG. 7 is a block diagram of a circuit including the dongle of FIGS. 2-5 connected to the hearing aid for providing power assist modes.
Figure 8:
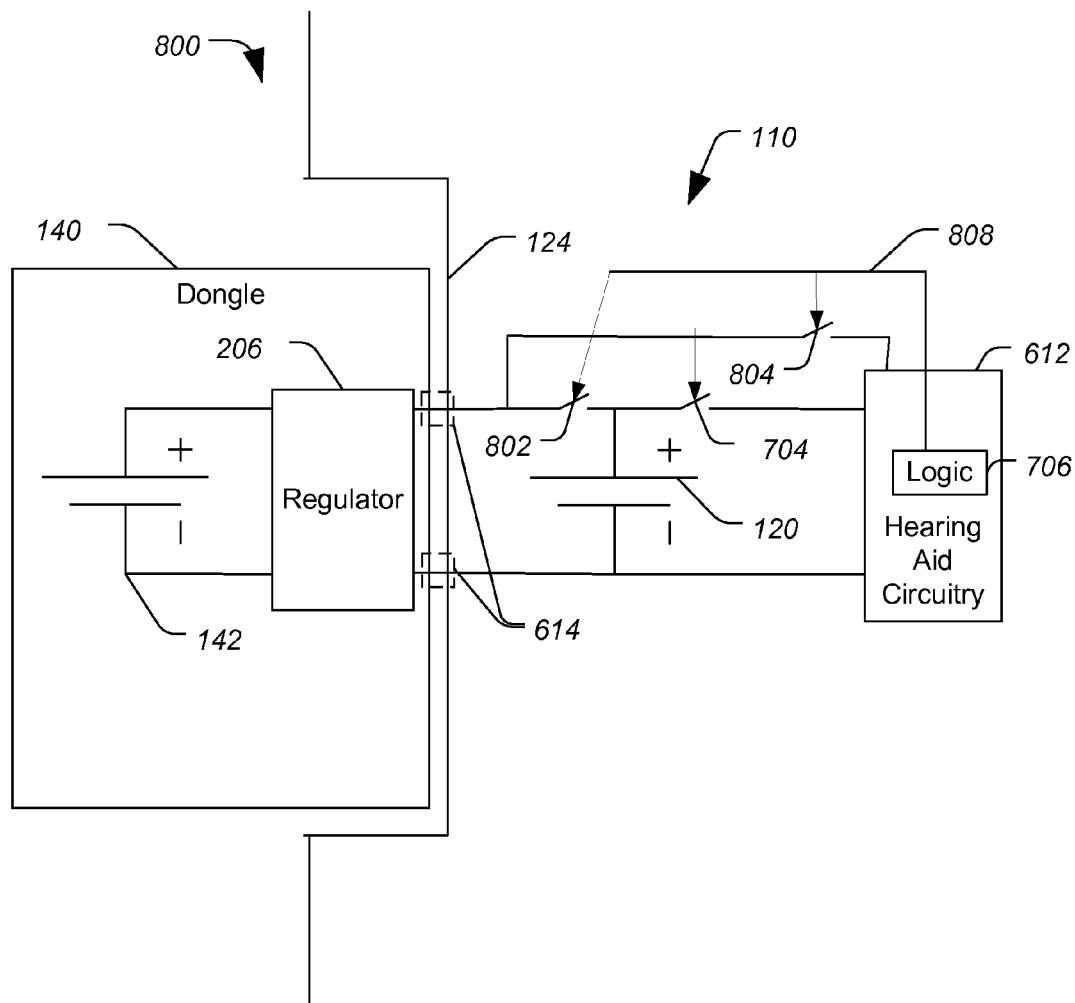
FIG. 8 is a block diagram of a circuit including of the dongle of FIGS. 2-5 connected to the hearing aid adapted to switch between a power assist mode, a recharge mode, a remote supply power mode, and a power assist/recharge mode.

FIGS. 2-5 show multiple embodiments 200, 300, 400, and 500 of dongle 140. FIGS. 6-8 depict possible circuit configurations of hearing aid 110 to utilize the power signal provided by dongle 140 as an auxiliary power source, a recharge power supply or both.

FIG. 6 is a block diagram of a dongle system 600 including a dongle 140 dongle of FIGS. 2-5 configured to couple to receptacle 124, which is shown as a recessed version, for recharging power source 120 within hearing aid 110. Receptacle 124 is recessed relative to a surface of hearing aid 110 for receiving the connector (such as connector interfaces 228, 230, or 506) of dongle 140.

Dongle system 600 includes dongle 140 coupled to receptacle 124 of a hearing aid 110 to form a connection assembly. Dongle 140 includes power source 142, which may include one or more batteries or other energy storage devices, which may be coupled to hearing aid 110 though a regulator 206 and through one or more electrically conductive terminals 614. When Dongle 140 is coupled to receptacle 124, power source 142 and regulator 206 are connected in parallel with power source 120 of hearing aid 110. Power source 120 is further coupled to hearing aid circuitry 612.

In the illustrated embodiment, when dongle 140 is uncoupled to receptacle 124, power source 120 provides power to hearing aid circuitry 612. In particular, power source 120 provides a voltage potential that can be converted into a current for powering hearing aid circuitry 612. However, when dongle 140 is coupled to receptacle 124, power source 142 within dongle 140 provides additional electrical current to power source 120. The additional electrical current is adjusted by power regulator 206 to an appropriate level for powering hearing aid 110 and/or for recharging power source 120.

FIG. 7 is a block diagram of a circuit 700 including dongle 140 dongle of FIGS. 2-5 coupled to receptacle 124 of hearing aid 110 for providing power assist modes. Dongle 140 and hearing aid 110 are the same as that described above with respect to FIG. 6, except that hearing aid 110 includes a switch 704 to selectively couple one terminal of power source 120 to hearing aid circuitry 612.

In the illustrated embodiment, when dongle 140 is coupled to receptacle 124, power source 142 and regulator 206 are coupled to hearing aid circuitry 612 through conductors 614. In this embodiment, hearing aid circuitry 612 may include logic 706 configured to control switch 704 to disconnect power 120 from hearing aid circuitry 612 in response to dongle 140. Switch 704 may also be controlled in a variety of other manners. For example, a contact sensor or proximity detector coupled to the surface of receptacle 124 could be used to trigger switch 704. Once switch 704 has been disconnected, dongle 140 provides power to hearing aid circuitry 612 in lieu of the internal power source 120 conserving the battery life.

FIG. 8 is a block diagram of circuit 800 including dongle 140 of FIGS. 2-5 connected to hearing aid 110 adapted to switch between a power assist mode, a recharge mode, a remote supply power mode, and a combined power assist/recharge mode. Dongle 140 and hearing aid 110 are the same as that described above with respect to FIG. 7, except that hearing aid 110 includes a second and third switch 802 and 804 to selectively switch between the power assist mode, the recharge mode, the remote supply power mode, and the combined power assist/recharge mode within hearing aid 110.

In the illustrated embodiment, when dongle 140 is coupled to receptacle 124, power source 142 and regulator 206 are coupled to hearing aid circuitry 612 through conductors 614. In this embodiment, hearing aid circuitry 612 may include logic 706 configured to provide a control signal 808 to switches 704, 802, and 804. Control signal 808 may cause hearing aid 110 to enter one of multiple modes. In a first mode control signal 808 causes switches 704 and 804 to close and switch 802 to open placing hearing aid 110 in the power assist mode, in which hearing aid circuitry 612 receives power from both dongle 140 and power source 120. In a second mode control signal 808 causes switches 802 and 704 to close and 804 to open placing hearing aid 110 in the recharge mode. In the third mode control signal 808 causes switches 802 and 704 to open and switch 804 to close placing hearing aid 110 in the remote power supply mode, in which the charge on power source 120 is conserved. In a fourth mode control signal 808 causes switches 802 and 804 to close and switch 704 to placing hearing aid 110 in the combined power assist/recharge mode, in which hearing aid 110 is simultaneously powered by power source 142 and power source 120 is recharged.

In the circuits described above with respect to FIGS. 6-8, a dongle is described that is configured to couple to a receptacle of a hearing aid to provide supplemental or replacement power to the hearing aid. In one instance, the external power dongle may include one or more batteries, which may be rechargeable or replaceable to provide a portable power supply for recharging and/or extending the usable power of one or more hearing aids.

In conjunction, embodiments of a hearing aid and a dongle are described above. The hearing aid embodiments including a first embodiment of a hearing aid and a second embodiment of a hearing aid described below.

The first embodiment of the hearing aid includes a hearing aid with a dual-use interface coupled to a rechargeable battery and configurable to mate with a connector of a dongle for receiving a power supply in a first mode and at least one of the power supply and an audio signal in a second mode. The hearing aid further including an audio circuit configured to receive the audio signal and to modulate the audio signal to compensate for the hearing impairment of the user and to reproduce the modulated audio signal as sound at a speaker. The hearing aid further including at least one microphone configured to convert sounds into a second audio signal and to provide the second audio signal to a processor in the audio circuit. The processor configured to either selectively combine the audio signal and the second audio signal to produce a combined audio signal and to modulate the combined audio signal to produce a modulated output signal or selectively shape the audio signal to generate a first shaped signal and the second audio signal to generate a second shaped signal and to selectively combine the first and second shaped signals to generate a modulated output signal.

The embodiment of the hearing aid includes a hearing aid with a processor configured to process audio signals to generated at least one shaped output signal configured to compensate for a hearing impairment of the user and a speaker configured to reproduce the shaped output signal as sound. The hearing aid further including an interface configurable to couple to a connector of a dongle for receiving a power supply in a first mode and for receiving at least one of the power supply and the audio signal in a second mode. The hearing aid can be configured to further include a rechargeable battery coupled to the interface and configured to recharge based on the power supply and to provide power to the processor.

The dongle embodiments including a dongle with a casing including a cavity for housing a power source. The dongle also includes a regulator and a connector configured to electrically and mechanically couple to a hearing aid, the dongle configured to provide a regulated power supply from the power source to the hearing aid during operation of the hearing aid. The power source may or may not be rechargeable. If the power source is not rechargeable the casing includes a removable cover which can be opened to allow a user to replace the power source within the cavity. However, if the power source is rechargeable the casing may be sealed. In a particular embodiment, the connector may include a magnetic element and secure to the hearing aid using magnetic forces. The dongle may also include a securing mechanism connected to the casing and configured to secure the dongle to an object, such as the clothing of the user.

Other dongle embodiments are disclosed that include a housing defining a receptacle for securing at least one battery within the housing. A wire may extend from the housing. The wire having a first portion with a first connector and a second portion with a second connector. Each of the connectors are configured to couple with a hearing aid, such that the dongle may couple with two hearings at the same time. A second wire may also extend form the housing having a third connector configured to couple to a computing device, wherein the dongle is configured to deliver at least one of a power supply and an audio signal from the computing device to the interface of the hearing aids via the wires. In some embodiments, the dongle may include a second component which acts as an adaptor configured to releasably couple the third connector to the computing device. The adapter being usable when the third connector is not compatible with the interface on the computing device.

While the above-discussion has focused on dongles that uses batteries, it should be appreciated that other power sources may be incorporated within the power dongle to deliver replacement power to a hearing aid. For example, a solar cell, capacitor, or other power source may be incorporated within power dongle to provide an appropriate power supply. It should also be understood, that regulator 206 of FIGS. 6 and 7 may also be incorporated into the hearing aid.

Although the present invention has been described with reference to preferred embodiments, workers skilled in the art will recognize that changes may be made in form and detail without departing from the scope of the invention.

What is claimed is:

1. A dongle for a hearing aid comprising:
    a first connector releasably couple to an input/output port of the computing device for receiving an audio signal and a first power supply signal from the computing device to delivery to the hearing aid;
    an on board power supply for generating a second power signal;
    a power regulator configured to receive the first power supply signal and the second power supply signal and to generate a regulated power supply for recharging the hearing aid; and
    a second connector to releasably couple to an interface of the hearing aid, for providing to the hearing aid the audio signal and at least one of the first power signal or the second power signal.

2. The dongle of claim 1, wherein the on board power supply is removable.

3. The dongle of claim 1, wherein:
    the audio signal includes a right audio signal and a left audio signal; and
    the second connector provides one of the right audio signal or the left audio signal to the hearing aid.

4. The dongle of claim 1, wherein the first connector comprises a tip-ring-sleeve (TRS) connector.

5. The dongle of claim 4, wherein the TRS connector includes at least two additional contacts for receiving the first power supply signal from the computing device.

6. The dongle of claim 1, wherein the power regulator is further configured to receive to receive the first power supply signal from the computing device and to generate the regulated power supply for recharging the on board power supply.

7. The dongle of claim 1, further comprising a third connector-to releasably couple to an interface of a second hearing aid.

8. The dongle of claim 1, wherein the on board power supply comprises at least one of a triple-A (AAA) battery, a double-A (AA) battery, a C battery, a D battery, or a 4.5 volt battery.

9. The dongle of claim 1, further comprising a securing mechanism to secure the dongle to an object.

10. A dongle assembly for a hearing aid comprising:
    a first connector configured to releasably couple to an input/output port of a computing device for receiving a first power signal and an audio signal from the computing device;
    an on board power supply for generating a second power signal; and
    a second connector configured to releasably couple to an interface of the hearing aid for providing to the hearing aid the audio signal and at least one of the first power signal or the second power signal.

11. The dongle assembly of claim 10, wherein the first power signal and the second power signal are provided to the hearing aid to recharge a battery associated with the hearing aid.

12. The dongle assembly of claim 11, wherein the second power supply signal recharges the on board power supply.

13. The dongle assembly of claim 12, wherein the on board power supply is removable.

* * * * *

UNITED STATES PATENT AND TRADEMARK OFFICE
CERTIFICATE OF CORRECTION

| | | |
|---|---|---|
| PATENT NO. | : 9,071,917 B2 | Page 1 of 1 |
| APPLICATION NO. | : 13/708009 | |
| DATED | : June 30, 2015 | |
| INVENTOR(S) | : Frederick Charles Neumeyer et al. | |

It is certified that error appears in the above-identified patent and that said Letters Patent is hereby corrected as shown below:

On the Title Page,

Item 60, change "61/416,888" to 61/416,688.

Signed and Sealed this
Third Day of November, 2015

Michelle K. Lee
*Director of the United States Patent and Trademark Office*